(12) United States Patent
Beer et al.

(10) Patent No.: US 7,155,899 B2
(45) Date of Patent: Jan. 2, 2007

(54) METHOD FOR HEATING AN EXHAUST GAS CATALYST FOR AN INTERNAL COMBUSTION ENGINE OPERATING WITH DIRECT FUEL INJECTION

(75) Inventors: Johannes Beer, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/539,191

(22) PCT Filed: Oct. 9, 2003

(86) PCT No.: PCT/DE03/03345

§ 371 (c)(1),
(2), (4) Date: Jun. 16, 2005

(87) PCT Pub. No.: WO2004/055347

PCT Pub. Date: Jul. 1, 2004

(65) Prior Publication Data

US 2006/0112680 A1 Jun. 1, 2006

(30) Foreign Application Priority Data

Dec. 17, 2002 (DE) ................................ 102 59 052

(51) Int. Cl.
*F01N 3/00* (2006.01)

(52) U.S. Cl. ........................... 60/284; 60/274; 60/285; 60/286; 123/90.15; 123/90.16

(58) Field of Classification Search .................. 60/274, 60/278, 280, 284, 285, 286; 123/90.15, 90.16
See application file for complete search history.

(56) References Cited

U.S. PATENT DOCUMENTS

| 5,706,790 | A | 1/1998 | Kemmler et al. |
| 5,881,552 | A | 3/1999 | Iwata et al. |
| 6,148,791 | A * | 11/2000 | Fujieda et al. ............... 123/295 |
| 6,192,678 | B1 | 2/2001 | Tachibana |
| 6,564,763 | B1 * | 5/2003 | Shiraishi et al. .......... 123/90.15 |
| 6,574,961 | B1 * | 6/2003 | Shiraishi et al. ............... 60/602 |
| 6,718,755 | B1 | 4/2004 | Brehob |
| 6,840,237 | B1 * | 1/2005 | Strom et al. ................. 123/684 |
| 6,898,927 | B1 * | 5/2005 | Morinaga et al. .............. 60/284 |

FOREIGN PATENT DOCUMENTS

DE 35 06 235 A1 9/1985

(Continued)

*Primary Examiner*—Binh Q. Tran

(57) ABSTRACT

The invention relates to the heating of an exhaust gas catalyst arranged on an internal combustion engine with direct fuel injection, variable valve drive and a blower device, whereby, after recognition of a cold start for the internal combustion engine, by means of a device, the valve lift (VH) and the valve overlap (VO) for the gas exchange valves and the position of a throttle valve, arranged in the inlet tract of the internal combustion engine are adjusted to give a positive pressure drop between the inlet side and the exhaust side of the internal combustion engine such that at least a part of the air pumped by the blower device is pumped directly from the inlet to the outlet side of the internal combustion engine into the exhaust line as flushing air. Optimal reaction conditions are thus obtained in the exhaust gas catalyst.

16 Claims, 2 Drawing Sheets

FOREIGN PATENT DOCUMENTS

| | | |
|---|---|---|
| DE | 44 41 164 A1 | 5/1996 |
| DE | 44 45 779 A1 | 6/1996 |
| DE | 198 36 955 A1 | 3/2000 |
| DE | 100 02 483 A1 | 7/2001 |
| DE | 102 50 121 A1 | 5/2003 |
| EP | 0 614 003 B1 | 9/1994 |
| EP | 1 243 779 A2 | 9/2002 |
| FR | 2781011 A1 | 1/2000 |

* cited by examiner

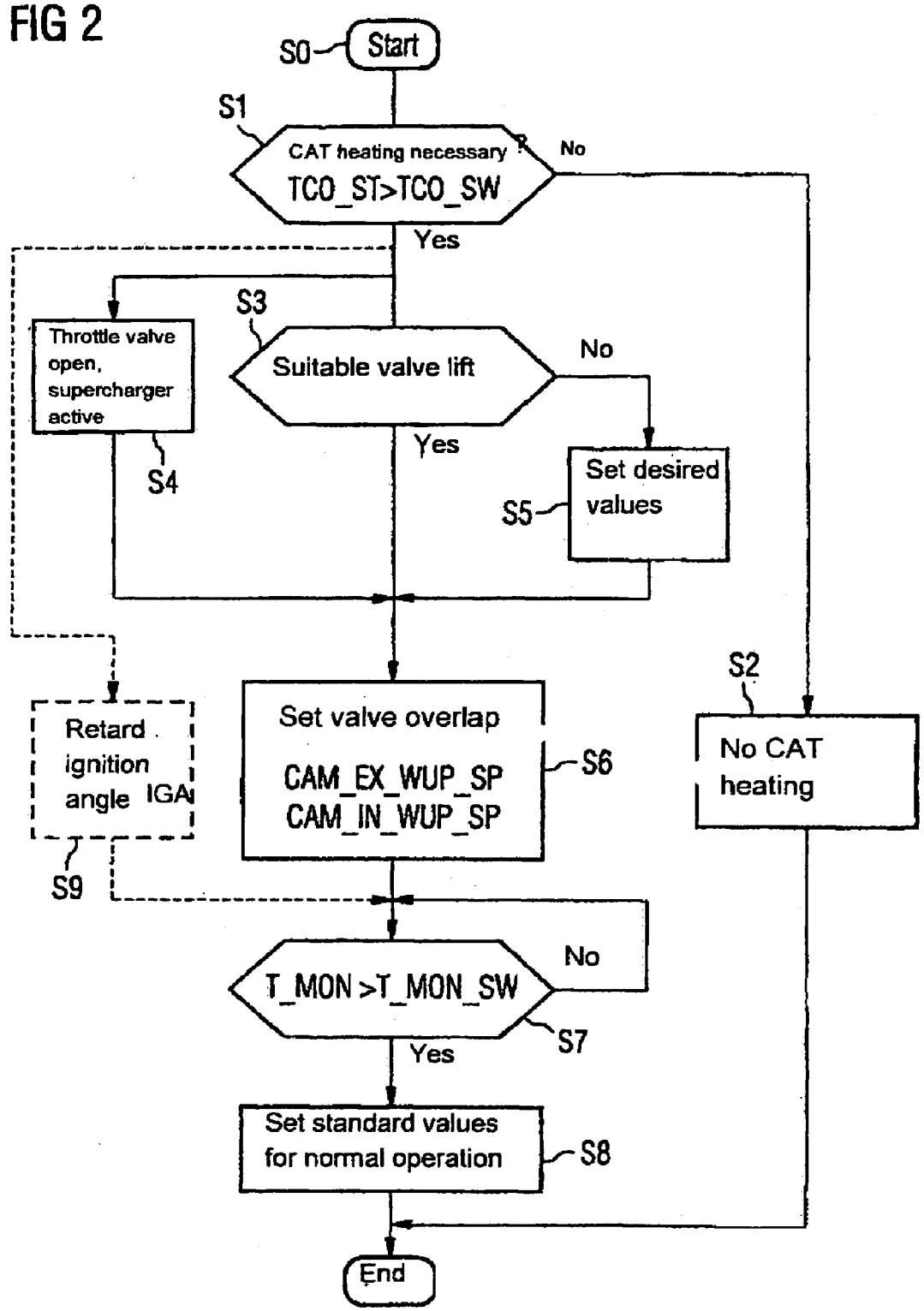

METHOD FOR HEATING AN EXHAUST GAS CATALYST FOR AN INTERNAL COMBUSTION ENGINE OPERATING WITH DIRECT FUEL INJECTION

CROSS REFERENCE TO RELATED APPLICATION

This application is the U.S. National Stage of International Application No. PCT/DE2003/003345, filed Oct. 9, 2003 and claims the benefit thereof. The International Application claims the benefits of German Patent application No. 10259052.4 DE filed Dec. 17, 2002, both of the applications are incorporated by reference herein in their entirety.

FIELD OF THE INVENTION

Method for heating an exhaust gas catalyst for an internal combustion engine operating with direct fuel injection.

The invention relates to a method for heating an exhaust gas catalyst for an internal combustion engine fitted with a blower device and operating with direct fuel injection, said internal combustion engine having a variable valve drive.

BACKGROUND OF THE INVENTION

Internal combustion engines with direct injection (DI) have a large potential for reducing fuel consumption at relatively low exhaust emission output. In contrast to manifold injection, the fuel with direct injection is injected directly into the combustion chambers of the combustion engine at high pressure.

Injection systems with a common rail are known for this purpose. In such common-rail systems, the fuel pressure, available largely independent of speed and rate of injection and controlled from the electronic control unit of the internal combustion engine by means of pressure sensors and pressure regulators, is built up in the common rail by means of a high-pressure pump. The fuel is injected into the combustion chamber by means of an electrically controlled injector. This receives its signals from the control unit. By means of the functional separation of the pressure generation and injection, the injection pressure can to a great extent largely be freely chosen independent of the actual operating point of the internal combustion engine.

To increase the power and torque of internal combustion engines, a blower device is known that increases the amount of charge by precompression. In this case, a supercharger supplies fresh air to the cylinder(s) of the internal combustion engine. With mechanical supercharging, the supercharger is driven directly from the internal combustion engine (e.g. supercharger charging), whereas with exhaust gas turbo charging a turbine drives a supercharger in the inlet tract of the internal combustion engine.

To reduce pumping losses, modern internal combustion engines have variable valve drives with a single, multi-stage or stepless variability. The variable valve control of the inlet and outlet valves offers the possibility of setting the valve timing more or less as required within the physical limits of the existing actuator principle (mechanical system, hydraulic system, electrical system, pneumatic system or a combination of the named systems). Such systems enable the valve overlap to be set. They are also known as VVT (variable valve timing) or IVVT (infinitely variable valve timing) systems. Variable valve control also enables the valve lift to be set. Such systems are known as VVL (variable valve lift) systems.

Reduced consumption, reduced untreated emissions and a higher torque can be achieved by using variable valve drives.

The exhaust emissions of an internal combustion engine can be effectively reduced by catalytic re-treatment of the exhaust gas using an exhaust gas catalyst in conjunction with a lambda control device. An important precondition for this is, however, that in addition to the lambda probe of the lambda control device, the catalyst must also have reached its light-off temperature. Below this temperature, the exhaust gas catalyst has little or no effect and reaction takes place only at sufficiently low conversion rates.

To ensure that the light-off temperature is quickly achieved and the exhaust emissions still reduced during the cold-start phase of the internal combustion engine, during which 50–90% of the complete emissions are output within the first 10–20 seconds, various warm-up strategies are known.

In systems with exhaust gas turbocharging, achieving the catalyst light-off that is optimum for emissions is critical due to the heatsink through the exhaust gas turbine. Secondary air systems are frequently used to limit the cold-start emissions.

To do this, for example, secondary air is blown in close to the exhaust valves by means of a secondary air pump during the warm-up. Due to the reaction of the blown-in air with the unburned exhaust gas constituents contained in the hot exhaust gases and the further oxidation in the catalyst, this is heated up more quickly.

DE 44 41 164 A1 describes a device for controlling the charge-air flow for a supercharged internal combustion engine, where the secondary air is not supplied from a separate secondary air pump but instead from a supercharger, provided in any case for the supply and compression of the charge-air. The charge-air is supplied to the internal combustion engine via a charge-air line, with a throttle valve being fitted in this charge-air line. Upstream of the throttle valve and downstream of the supercharger, a circulating air line branches off to the suction side of the supercharger. A circulating air actuator is fitted in the circulating air line. A connecting line leads from the pressure side of the supercharger to an exhaust gas line of the internal combustion engine, with a regulating valve connected to an engine control unit being fitted in this connecting line. To realize a wide operating range of the internal combustion engine with an optimum supply of secondary air to achieve the best possible exhaust gas values, it is suggested that this branch of the connecting line be arranged in the charge-air line upstream of the circulating air line.

From DE 44 45 779 A1, a method is known for the control of a multicylinder internal combustion engine in the cold-start and warm-up phase. The gas charge cycle in the individual cylinders of this internal combustion engine takes place via inlet devices, at least for the air and outlet devices for the exhaust gas, that can be controlled independently of each other but with opening times and closing times that can be harmonized to each other. Starting in the cold-start phase and continuing up to the warm-up phase, the fuel is supplied only to one part of the cylinders and the supply of fuel to the other part of the cylinders is switched off, and they then operate as compressors and the amount of air heated in these cylinders by the compression process is fed via the outlet device into the exhaust gas system for the after-reaction of the exhaust gases.

SUMMARY OF THE INVENTION

The object of the invention is to provide a method by means of which the exhaust gas catalyst of a supercharged internal combustion engine with a variable valve drive and direct fuel injection can be efficiently heated by simple means.

This object is achieved by a method such as is given in the claims.

Advantageous further embodiments of the method in accordance with the invention are the object of the subclaims.

A supercharged direct injection spark ignition internal combustion engine operating with a homogenous mixture offers, when operating close to full load, the possibility of flushing fresh air directly into the exhaust line. A condition for this is a positive pressure drop between the inlet and outlet sides at the time of the gas exchange (OT) (top dead center) as well as an adequate valve overlap between the outlet and inlet valves. The valve overlap can, for example, be set by an infinitely variable timing (IVVT) system or a variable valve timing (VVT) system.

The direct injection of fuel into the combustion chamber ensures that the start of injection begins after the outlet valve closes. Therefore, only fresh air without fuel is flushed to the exhaust side.

Because of the additional flushing air, the air mass flow in the case of an internal combustion engine with an exhaust gas turbocharger is increased, which on one hand means that the transient behavior and also the achievable maximum power are increased and on the other hand, because of the additional flushing air, the lambda $\lambda_{Ex}$ measured in the exhaust gas no longer agrees with the combustion lambda $\lambda_{Cyl}$ in the cylinder. If the exhaust gas lambda $\lambda_{Ex}$ is held to $\lambda_{Ex}=1$ by means of lambda control, a combustion lambda of $\lambda_{Cyl}<1$ results. The combustion of the rich mixture in the cylinder causes a high CO and HC content in the exhaust gas. In conjunction with the high residual oxygen content due to the amount of flushing air, optimum reaction conditions result in the exhaust gas catalyst located downstream of the turbine of the exhaust gas turbocharger.

The method cannot be used in the form previously described for catalyst heating from cold-start conditions, because a load greater than the induction engine full load occurs only just after the start of the internal combustion engine. An operating mode of this kind is moreover not relevant for the exhaust gas test cycles used (MVEG, FTP75).

By means of an additional variable valve lift (VVL) functionality, a switch to a lower valve lift can be made under cold-start conditions. The lower valve lift means that the amount of fresh air supplied to the internal combustion engine is substantially reduced at a constant induction manifold pressure. Compensation can be achieved by increasing the induction manifold pressure level by opening the throttle valve completely and precompressing the charge by supercharging. In this way, the positive pressure drop required for flushing is also realized under start conditions and the light-off temperature of the exhaust gas catalyst is reached sooner.

The main advantage of the invention is in the omission of the secondary pump, the associated valves and the connecting lines.

When a supercharged internal combustion engine is operating close to full load, a positive pressure difference between the inlet and outlet sides combined with a corresponding valve overlap VO has the effect that fresh air is flushed to the exhaust gas side. The amount of flushing air increases the throughput through the engine without participating in the combustion. The following particular advantages result for the operating behavior.

with a lambda value $\lambda_{Ex}=1$ in the exhaust gas, combustion in the cylinder occurs with flushing air at a lambda value $\lambda_{Cyl}<1$. The tendency to knock is reduced by the combustion with a rich mixture.

The effect of $\lambda_{Cyl}<1$ is a very high CO and HC content in the exhaust gas. At the same time, the amount of flushing air means that there is a high residual oxygen content and thus an internal secondary air effect. The resulting exhaust gas composition produces a high exothermy in the exhaust gas catalyst and thus accelerates the heating-up behavior.

The flushing reduces the amount of residual gas in the combustion chamber and thus also the tendency to knock. Minimizing the amount of residual gas is of decisive importance at full load in order to achieve maximum cylinder filling and to also make this filling effective i.e. with a favorable combustion center of gravity position.

the additional amount of flushing air increases the mass flow through the turbine, which means that at lower engine speeds both the response behavior and the achievable maximum power can be increased.

The ratio of the air mass remaining in the cylinder to the total mass of air aspirated over a working cycle is known as the trapping efficiency (TE). This is as follows:

$$TE = \frac{\text{Cylinder air mass}}{\text{Total mass of aspirated air}} = \frac{M_{Cyl}}{M_{Cyl} + M_{Scav}} \quad (1)$$

The total amount of aspirated air consists of the air mass $M_{Cyl}$, remaining in the cylinder and the flushing air mass $M_{Scav}$, i.e. the air mass that is flushed through the cylinder. From the relationship (1), it follows that $TE \leq 1$. The greater the flushing air mass $M_{Scav}$ the smaller the value for the trapping efficiency TE, i.e. the air mass meter 13 (FIG. 1) measures the total air mass that is aspirated overall, but that is then spread over the trapping efficiency TE into an air mass that participates in the combustion and into an air mass that is flushed through the internal combustion engine.

With an IVVT (infinitely variable valve timing) system, the TE over the inlet and outlet cam shaft positions can be infinitely varied between a minimum value (maximum flushing air) and a value 1 (no flushing air, $M_{Scav}=0$).

Because of the amount of flushing air mass $M_{Scav}$ that does not participate in the combustion, the lambda $\lambda_{Ex}$ measured in the exhaust gas does not agree with the combustion lambda $\lambda_{Cyl}$. The following relationship applies:

$$TE \cdot \lambda_{Ex} = \lambda_{Zyl} \quad (2)$$

Due to the lambda value $\lambda_{Ex}=1$, that is set by means of the lambda control device, and a trapping efficiency TE<1 (positive flushing drop, valve overlap>0), a $\lambda_{Cyl}=1$ results. This means that combustion of the fuel in the combustion chamber is incomplete. A high concentration of CO and HC thus occurs in the exhaust gas. Due to the amount of flushing air in the exhaust gas, ideal conditions are present for an after-reaction in the exhaust gas catalyst. The high concentrations of unburned fuel constituents together with the high residual oxygen content lead to a strong exothermy in the exhaust gas catalyst. The monolith temperature of the exhaust catalyst can thus rise into critical ranges. The method in accordance with the invention is explained in more detail with the aid of an example. The illustrations are as follows:

BRIEF DESCRIPTION OF THE DRAWINGS

FIG. 2 A flow diagram that illustrates a form of embodiment of the method in accordance with the invention.

DETAILED DESCRIPTION OF THE INVENTION

Figure 1:
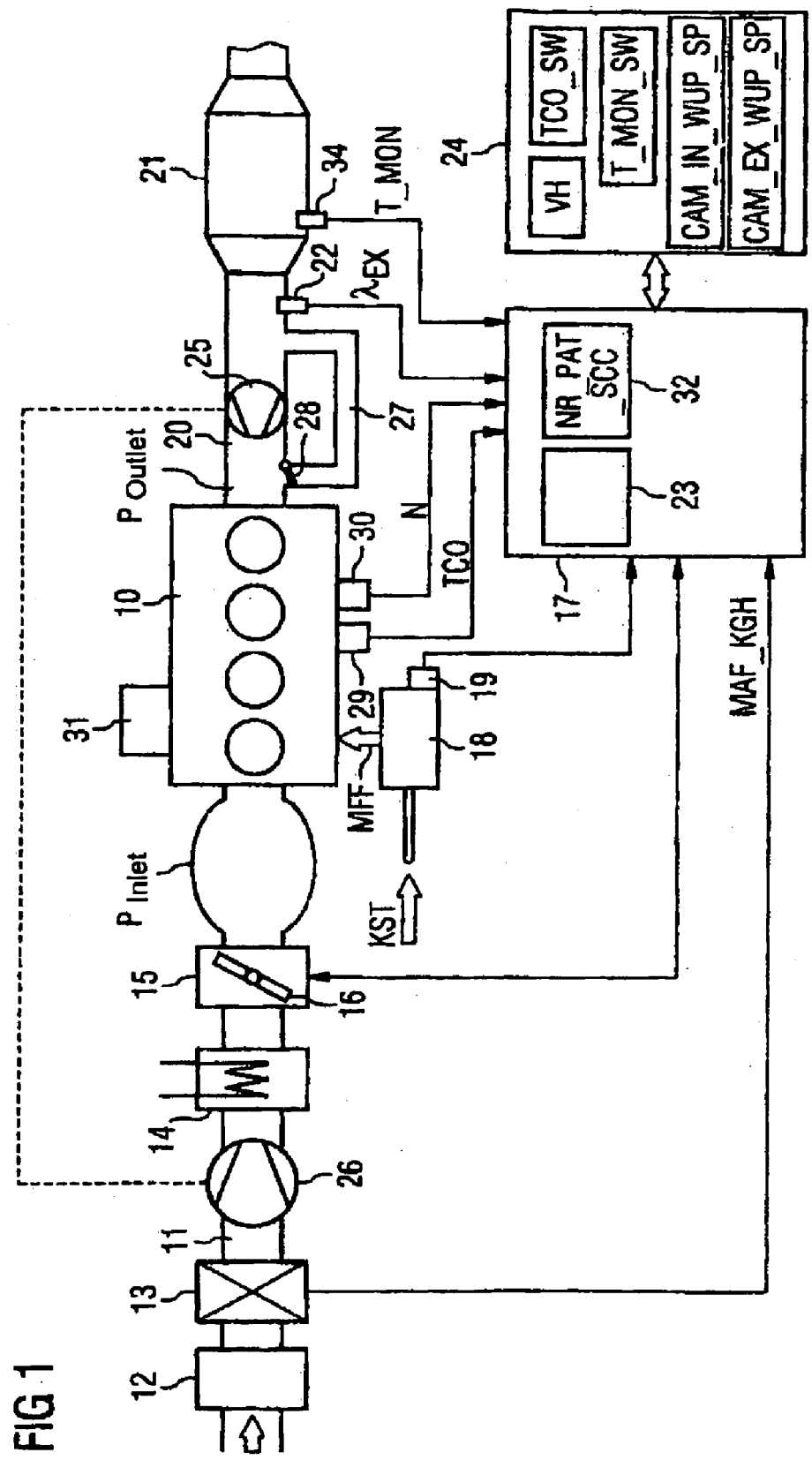
FIG. 1 A very simplified block diagram of a supercharged, variable valve drive internal combustion engine using direct fuel injection, with the method in accordance with the invention being used.

FIG. 1 is a block diagram showing a supercharged spark ignition internal combustion engine 10 with direct fuel injection and an exhaust gas treatment system assigned to it. Only those components necessary for an understanding of the invention are shown. In particular, the ignition system, the fuel circuit and the cooling circuit have been omitted.

The internal combustion engine 10 receives the fresh air necessary for combustion via an inlet tract 11. The supplied fresh air flows through an air filter 12, an air flow meter 13 and a charge-air intercooler 14 to a throttle valve block 15. The throttle valve block 15 contains a throttle valve 16 and a throttle valve sensor (not illustrated) that provides a signal corresponding to the opening angle of the throttle valve 16. The throttle valve 16 is, for example, an electromechanically controlled throttling device (E gas) the opening cross-section of which can, after actuation by the driver (driver's wish) can be set by corresponding signals from a control device 17 relative to the operating range of the internal combustion engine. The air flow meter 13, for air flow guided control of the internal combustion engine as it is called, acts as a load sensor, the output signal MAF_KGH of which is supplied for further processing to the control device 17.

The internal combustion engine 10 has a fuel metering device 18 that supplies fuel KST under high pressure and has a number of injection valves corresponding to the number of cylinders of the internal combustion engine, controlled by suitable signals from injection final stages, that are preferably integrated into the electronic control device 17 of the internal combustion engine. Fuel is injected directly into the cylinders of the internal combustion engine 10 through the injection valves. In this case, the injection valves are advantageously supplied with fuel from a common rail. The rate of fuel injected by an injection valve is designated MFF. A pressure sensor 19 at the fuel metering device 18 detects the fuel pressure FUP at which the fuel is injected directly into the cylinders of the internal combustion engine.

The output end of the internal combustion engine 10 is connected to an exhaust line 20 in which an exhaust gas catalyst 21 is fitted. A 3-way catalyst or a NOx storage catalyst or a combination of the two can be provided. The sensor system for the exhaust gas treatment mainly contains exhaust gas sensors in the form of a lambda probe 22 upstream of the exhaust gas catalyst 21.

The temperature of the exhaust gas catalyst 21, more exactly the monolith temperature T_MON of the exhaust gas catalyst, is preferably calculated from various input variables using any known exhaust gas temperature model, such as for example as is described in DE 198 36 955 A1.

As an alternative, the monolith temperature can also be detected by means of a temperature sensor 34 fitted in the front part of the exhaust gas catalyst 21, viewed in the direction of flow of the exhaust gas. The signal T_MON is supplied to the control device 17 for further processing.

The mixture is controlled according to preset values by means of the signal $\lambda_{Ex}$ from the lambda probe 22. This function is carried out by a known lambda control device 23 that is preferably integrated into the control device 17 controlling or regulating the operation of the internal combustion engine. Such electronic control devices 17, that usually contain one or more microprocessors and in addition to controlling fuel injection and ignition also perform a number of other control tasks, are known, so that only the construction and functioning relevant in conjunction with the invention are dealt with in the following. In particular, the control device 17 is connected to a storage device 24, in which mainly different maps and threshold values are stored, the significance of which will be explained.

To increase the cylinder filling and therefore the power increase of the internal combustion engine 10, a supercharging device in the form of a known exhaust gas turbocharger is provided, the turbine 25 of which is arranged in the exhaust gas line 20, and which is functionally connected by a shaft (shown by a dashed line in the figure, and not further described) to a compressor 26 in the inlet tract 11. The exhaust gases thus drive the turbine 25 and this in turn drives the compressor 26. The compressor 26 performs the aspiration and supplies the internal combustion engine 10 with a precompressed fresh charge. The charge-air intercooler 14, located downstream of the compressor 26, draws off the compression heat via the cooling circuit of the internal combustion engine 10. This enables the cylinder filling to be further improved. A bypass line 27, that can be opened to various widths via a wastegate 28, is fitted parallel to the turbine 25. This enables a variable amount of the mass flow from the internal combustion engine to be bypassed to turbine 25 so that the compressor 26 of the exhaust gas turbocharger can be driven at different power.

A temperature sensor 29 detects a signal corresponding to the temperature of the internal combustion engine, usually the coolant temperature TCO. A speed sensor 30 detects the speed N of the internal combustion engine. Both signals are supplied to the control device 17 for further processing.

Furthermore, the internal combustion engine 10 has a device 31 with the aid of which both the valve overlap of the inlet valves and of the outlet valves and also the valve lifts can be set and changed. Such variable valve control can be realized using mechanical systems, hydraulic systems, electrical systems, pneumatic systems, or by a combination of these systems. In doing so, a distinction can be made between infinitely variable valve drives and valve systems that can be set in stages.

To shut down individual cylinders of the internal combustion engine, the control device 17 has a device 32, with the aid of which the fuel supply to individual cylinders of the internal combustion engine can be shut off according to a given shut-off pattern, the shut-off pattern NR_PAT_SCC, and again released. A device of this kind is, for example, described in EP 0 614 003 B1. Switching off the fuel to individual cylinders means that the "fired" cylinders are utilized to a greater degree, which means that the quality of the combustion and the efficiency of the gas cycle are improved.

The amount of fuel injection MMF required for combustion is calculated in the conventional manner from a load parameter i.e. the aspirated air mass MAF_KGH and the speed N and subjected to several corrections (influence of temperature, lambda controller, etc.).

The method in accordance with the invention for heating the exhaust gas catalyst using flushing air is now described with the aid of FIG. 2.

The method begins with method step 50, immediately the internal combustion engine 10 is started. The exhaust gas catalyst 21 cannot convert the pollutants that occur until the light-off temperature is reached. The temperature for each pollutant indicates the monolith temperature at which 50% of the pollutants fed to the catalyst is converted. By reducing the light-off time, the amount of pollutants liberated during the cold-start can be reduced, taking account of the amount of pollutants supplied up to this time point.

In a method step S1, the question is therefore asked whether heating of the exhaust gas catalyst 21 is really necessary.

The presence of a cold-start operation is typically identified an initial approximation if the coolant temperature TCO_ST drops below a threshold value TCO_SW when the internal combustion engine is starting. The threshold value TCO_SW is experimentally determined and is entered in the storage device 24.

Because the internal combustion engine usually cools down more slowly than the exhaust gas catalyst, this may mean that the temperature of the coolant of the internal combustion engine may still, for example, be 80° C., which would indicate a hot internal combustion engine, but the temperature of the exhaust gas catalyst will already have dropped below its light-off temperature. If the signal of the coolant temperature sensor is then used as the only criterion for activating or not activating measures for heating the exhaust gas catalyst, this can lead, under certain circumstances, to increased pollutant output after the start of the internal combustion engine. It is therefore appropriate to take account of the shutdown time of the internal combustion engine and/or the ambient temperature in addition to the coolant temperature. This can advantageously take place by using a known cooling model for the exhaust gas catalyst. It is also possible to detect the monolith temperature of the exhaust gas catalyst by means of a temperature sensor fitted directly on the exhaust gas catalyst.

The internal combustion engine is operated from the earliest possible time point by the lambda controller using a lambda value $\lambda_{Ex}$ of 1 in the exhaust gas. A state of $\lambda_{Ex}=1$ is achieved before the lambda probe is ready, by an appropriate pilot control of the injection amount.

If the response to the question in method step S1 is that the exhaust gas catalyst 21 has already reached its light-off temperature, no heating measures are then activated for the exhaust gas catalyst (method step S2) and the method is ended.

If the response to the question in method step S1 is positive, i.e. the exhaust gas catalyst 21 has still not reached its light-off temperature, then in a method step S3 a check is carried out to determine whether a suitable valve lift, i.e. a preset desired value VH of the inlet and outlet valves has been set for flushing and thus for heating the exhaust gas catalyst 21. The value for the valve lift VH is experimentally determined and is entered in the storage device 24. If the desired value for the valve lift VH is already set, then a branching to method step S6 takes place, otherwise this desired value is set in method step S5.

A switch to a lower valve lift VH thus takes place during starting by means of the VVL (variable valve lift) functionality. The lower valve lift means that the amount of fresh air fed to the internal combustion engine is reduced at constant induction manifold pressure. This filling deficit is compensated for by increasing the induction manifold pressure by completely opening the throttle valve 16 and precompressing the charge by supercharging (method step S4), i.e. these processes run in parallel. In this way, the positive pressure drop required for the flushing operation are realized under start conditions.

In method step S6, the IVVT desired values CAM_EX_WUP_SP and CAM_IN_WUP_SP for the inlet and outlet settings and the resulting valve overlap VO for hot operation of the exhaust gas catalyst are chosen according to the following conditions:

The resulting trapping efficiency TE and the $\lambda_{Cyl}$, defined at $\lambda_{Ex}=1$, provides the optimum CO, HC exhaust gas concentration and residual oxygen content for the heating operation.

CAM_EX_SP=CAM_EX_WUP_SP

CAM_IN_SP=CAM_IN_WUP_SP                (4)

This means that a value CAM_EX_WUP_SP is chosen as a desired value CAM_EX_SP for the outlet valve and a value CAM_IN_WUP_SP as a desired value for the inlet valve. These values are each entered in a map in the storage device 24, depending on the aspirated air mass MAF_KGH, the speed N and the monolith temperature T_MON.

An IVVT position controller of the device 31 sets the actual inlet and outlet cam shaft positions CAM_EX, CAM_IN to the predetermined desired values. The actual valve overlap VO is determined from the measured actual positions CAM_EX, CAM_IN.

As supporting heating measures, the exhaust gas temperature can be raised by retarding the ignition angle IGA, which means that the increased exhaust gas temperature at the catalyst inlet additionally reduces the light-off time. This is shown in FIG. 2 as method step S9 by means of a dotted line.

In method step S7, a check is carried out to determine whether the monolith temperature T_MON has exceeded a predetermined threshold value T_MON_SW (typically 250–300° C.), that mainly depends on the construction properties of the material used.

This question is repeated until the monolith temperature T_MON has exceeded the threshold value T_MON_SW (waiting loop).

The monolith temperature T_MON is preferably determined by using a temperature model depending on the operating variables of the internal combustion engine as follows:

$$T\_MON=T\_MON\ (N, MAF\_KGH, IGA, \lambda_{Ex}, VS, TCO, NR\_PAT\_SCC, TE) \quad (5)$$

Examples of the input variables for the temperature model are the following, either individually, or in combination:

The speed N, the aspirated air mass MAF_KGH, the ignition angle IGA, the lambda value in the exhaust gas $\lambda_{Ex}$, the driving speed (cooling due to airflow over the moving vehicle), the coolant temperature, the shutdown pattern for cylinder deactivation NR_PAT_SCC and the trapping efficiency TE.

Alternatively, the monolith temperature T_MON can also be measured directly using the temperature sensor 34.

If the catalyst monolith temperature T_MON exceeds the threshold value T_MON_SW, the desired values for valve lift and valve overlap VO for the inlet and outlet valve are brought back to the standard values corresponding to the operating point of the internal combustion engine 10, that are again entered in the storage device relative to the operating range of the internal combustion engine, particularly relative to the speed N, the supplied air mass MAF_KGH and the coolant temperature TCO. Adjustment takes place continuously by means of an integrator. The increased opening of the throttle valve is also adapted to the present operation (no start operation) (method step S8).

The described method is also suitable for raising the temperature of a NOx storage catalyst to the temperature necessary for desulfurization. This temperature is distinctly higher than the light-off temperature and is typically 650–750° C. If the load on the internal combustion engine is greater than the induction engine full load (at maximum valve lift), the reduction in the valve lift at low loads required for induction manifold pressure increase must be omitted in this case.

The invention claimed is:

1. A method for heating an exhaust gas catalyst of an internal combustion engine having, an inlet tract with a throttle valve arranged within the inlet tract, a combustion chamber with gas exchange valves in the form of an inlet and outlet valve, an exhaust line with an exhaust gas catalyst arranged the exhaust line, a blower device for pre-compressing the air supplied to the combustion chamber, a device for setting the valve overlap and valve lift of the gas exchange valves, an injection valve for injecting fuel directly into the combustion chamber, a device that determines the amount of fuel required to be injected for homogenous operation of the internal combustion engine, and after detection of a cold-start of the internal combustion engine, comprising:
   switching to a lower valve lift and increasing the induction manifold pressure by completely opening the throttle valve and pre-compression of the air by supercharging, in order to generate a positive pressure drop from the inlet side to the outlet side of the internal combustion engine;
   setting the valve overlap of the gas exchange valves in order to deliver at least part of the air supplied by the blower device as flushing air directly from the inlet side to the outlet side of the internal combustion engine in the exhaust line;
   injecting fuel directly into the combustion chamber and after closure of the outlet valve, the injected fuel mixing with an air mass remaining in a cylinder;
   combusting the mixed injected fuel and air mass to produce a gas having a $\lambda_{cyl}$ less than 1 and exhausting the gas from the combustion chamber into the exhaust line; and
   mixing the exhausted gas with flushing air to produce a mixture having a $\lambda_{ex}$ greater than $\lambda_{cyl}$ to improve CO and HC concentrations and residual oxygen content for heating the exhaust gas catalyst.

2. The method in accordance with claim 1 wherein the coolant temperature is used as a criterion for a cold-start of the internal combustion engine.

3. The method in accordance with claim 1 wherein the coolant temperature and the shutdown time of the internal combustion engine and/or the ambient temperature are used as a criterion for a cold-start of the internal combustion engine.

4. The method in accordance with claim 1, wherein the values for the valve lift are experimentally determined and entered in a storage device of a control device regulating and controlling the internal combustion engine.

5. The method in accordance with claim 1, characterized in that the values for the valve overlap are entered in a storage device of a control device controlling the internal combustion engine, depending on operating parameters of the internal combustion engine.

6. The method in accordance with claim 5, wherein the aspirated air mass, the speed and the monolith temperature are used as operating parameters for the internal combustion engine.

7. The method in accordance with claim 1, wherein the ignition angle is impeded.

8. The method in accordance with claim 1, wherein the mixture produces an exothermic reaction in the exhaust gas catalyst.

9. The method in accordance with claim 1, wherein the valve overlap is set based on a trapping efficiency and $\lambda_{cyl}$ that are defined when $\lambda_{ex}$ is equal to 1.

10. The method in accordance with claim 1 wherein $\lambda_{ex}$ is equal to 1.

11. A method for heating an exhaust gas catalyst of an internal combustion engine having a blower device for pre-compressing a volume of air supplied to a combustion chamber and having direct fuel injection, comprising:
   setting a lower valve lift for a plurality of gas exchange valves during cold start conditions;
   opening a throttle valve and pre-compressing an air charge by the blower device to increase an induction manifold pressure to produce a positive pressure drop from an inlet side to an outlet side of the internal combustion engine;
   setting a valve overlap of the gas exchange valves to deliver at least part of the air supplied by the blower device as flushing air from the inlet side to the outlet side of the internal combustion engine;
   injecting fuel directly into the combustion chamber after closure of the outlet valve such that the flushing air remains fuel free;
   combining an exhaust gas exiting the combustion chamber with the flushing air in an exhaust line to produce a mixture of exhaust gas and flushing air; and
   monitoring the mixture with a $\lambda$ probe that provides feedback to a device to control the valve overlap such that the mixture has a desired $\lambda_{ex}$ equal to 1,
   whereby the mixture will cause an exothermic reaction to occur in the exhaust gas catalyst to more rapidly heat the exhaust gas catalyst.

12. The method in accordance with claim 11, wherein the amount of valve overlap and valve lift is set so $\lambda_{ex}$ is equal to 1.

13. The method in accordance with claim 11, wherein the values for the valve lift are experimentally determined and entered in a storage device of a control device regulating and controlling the internal combustion engine.

14. The method in accordance with claim 11, characterized in that the values for the valve overlap are entered in a storage device of a control device controlling the internal combustion engine, depending on operating parameters of the internal combustion engine.

15. The method in accordance with claim 14, wherein the aspirated air mass, the speed and the monolith temperature are used as operating parameters for the internal combustion engine.

16. A method for heating an exhaust gas catalyst of an internal combustion engine with fuel injection during a cold start, comprising:
   starting the internal combustion engine;
   opening a throttle valve and pre-compressing an air charge by a supercharging device;
   setting a valve overlap of the gas exchange valves and setting a lower valve lift to deliver at least part of the pre-compressed air charge delivered by the supercharging device as flushing air directly from the inlet side to the outlet side of the internal combustion engine and mixing the flushing air with a volume of exhausted gas, the exhausted gas having a $\lambda_{cyl}$ less than 1, to produce a mixture such that the mixture has a $\lambda_{ex}$ that approaches 1 in value; and
   flowing the mixture to the exhaust gas catalyst to produce an exothermic reaction.

* * * * *